(12) United States Patent
Tripathi et al.

(10) Patent No.: US 12,554,567 B2
(45) Date of Patent: Feb. 17, 2026

(54) APPARATUSES, METHODS, AND SYSTEMS FOR DETECTING AN UNRESPONSIVE CLIENT

(71) Applicant: CIENA CORPORATION, Hanover, MD (US)

(72) Inventors: Shalendra Tripathi, Gurugram (IN); Ashutosh Maheshwari, Gurugram (IN); Shubham Mishra, Kanpur (IN)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/659,113

(22) Filed: May 9, 2024

(65) Prior Publication Data

US 2025/0307044 A1 Oct. 2, 2025

(30) Foreign Application Priority Data

Mar. 27, 2024 (IN) .............................. 202411024344

(51) Int. Cl.
*G06F 11/07* (2006.01)
*G06F 9/54* (2006.01)

(52) U.S. Cl.
CPC .......... *G06F 11/0757* (2013.01); *G06F 9/547* (2013.01)

(58) Field of Classification Search
CPC .............................. G06F 11/0757; G06F 9/547
See application file for complete search history.

(56) References Cited

U.S. PATENT DOCUMENTS

| | | | | |
|---|---|---|---|---|
| 10,122,645 | B2 * | 11/2018 | Acharya | H04L 47/6255 |
| 10,230,670 | B1 * | 3/2019 | Cui | H04L 51/23 |
| 10,944,683 | B1 * | 3/2021 | Roskind | H04L 47/58 |
| 2002/0055983 | A1 * | 5/2002 | Goddard | H04L 67/563 |
| | | | | 709/217 |
| 2019/0278746 | A1 * | 9/2019 | Cree | G06F 11/2023 |
| 2021/0055976 | A1 * | 2/2021 | Ross | G06F 9/546 |
| 2024/0291831 | A1 * | 8/2024 | Tembey | G06F 9/547 |
| 2025/0030643 | A1 * | 1/2025 | Evens | H04L 47/564 |
| 2025/0053456 | A1 * | 2/2025 | Gustafsson | G06F 9/5038 |

OTHER PUBLICATIONS

"Bidirectional streaming RPC", https://grpc.io/docs/what-is-grpc/core-concepts/#bidirectional-streaming-rpc, Dec. 21, 2022, 3 pgs.

* cited by examiner

*Primary Examiner* — Robert W Beausoliel, Jr.
(74) *Attorney, Agent, or Firm* — Guntin & Gust; Mark Wilinski

(57) ABSTRACT

Aspects of the subject disclosure may include, for example, identifying a first client that is associated with a first data item, identifying a first time when the first data item is obtained, identifying a second time associated with a second data item, wherein a receipt of the second data item has not been acknowledged by the first client when the first data item is obtained, computing a first time difference between the first time and the second time, comparing the first time difference to a first threshold, resulting in a first comparison, and initiating a first action based on the first comparison. Other embodiments are disclosed.

20 Claims, 4 Drawing Sheets

100

200

APPARATUSES, METHODS, AND SYSTEMS FOR DETECTING AN UNRESPONSIVE CLIENT

CROSS-REFERENCE TO RELATED APPLICATION(S)

The instant application claims priority to India patent application Ser. No. 202411024344, filed Mar. 27, 2024. All sections of the aforementioned application(s) are incorporated herein by reference in their entirety.

FIELD OF THE DISCLOSURE

The subject disclosure relates to apparatuses, methods, and systems for detecting an unresponsive client.

BACKGROUND

As the world increasingly becomes connected via vast communication networks and systems and via various communication devices, additional opportunities are created/generated to provision communication services. gRPC is an open-source Remote Procedure Call (RPC) framework that can run/execute in a multitude of environments and may be used to connect services in and across data centers with support for load balancing, tracing, health monitoring, and authentication. gRPC may also be used in respect of distributed platforms to connect devices, applications, browsers, and the like to backend services.

In many environments, a gRPC client and gRPC server may connect to one another to facilitate communication services. However, there may be instances or scenarios where connectivity is compromised, in whole or in part. For example, a client application may "hang", or become inoperable, for some time due to a network condition (e.g., a network connection error, excessive load, etc.). In this regard, a gRPC client application (e.g., gRPC Network Management Interface (gNMI)) may also "hang", however an associated TCP layer may remain up-and-running or functional, due in part to TCP or HTTP/2 "keep-alive" messages successfully being exchanged between both ends (e.g., client and server). The result is that a gRPC client that is in an inactive, inoperable, or compromised state might not be detected/identified for an excessively long time, which could lead to an accumulation of outbound gRPC messages to such an extent that an out of memory (OOM) condition may be encountered on the server side/end. Further, the compromised client may negatively impact the server in terms of, e.g., a provisioning of services, signals, messages, or the like, to other, healthy non-compromised clients. This issue can be exploited by nefarious actors or users with malicious intent; for example, as part of denial of service (DoS) attacks.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for detecting/identifying unresponsive clients/client devices and reducing (e.g., isolating) an impact that an unresponsive client/client device has on network or system performance relative to other clients/client devices (potentially in terms of applications, communication services, or the like). Other embodiments are described in the subject disclosure.

One or more aspects of the subject disclosure include, in whole or in part, identifying a first client that is associated with a first data item; identifying a first time when the first data item is obtained; identifying a second time associated with a second data item, wherein a receipt of the second data item has not been acknowledged by the first client when the first data item is obtained; computing a first time difference between the first time and the second time; comparing the first time difference to a first threshold, resulting in a first comparison; and initiating a first action based on the first comparison.

One or more aspects of the subject disclosure include, in whole or in part, obtaining a first data item; based on the obtaining of the first data item, generating a first timestamp; storing the first data item in a queue; obtaining a second data item; based on the obtaining of the second data item, generating a second timestamp; based on the obtaining of the second data item, determining that the first data item is an oldest data item stored in the queue; based on the determining, computing a time difference between the second timestamp and the first timestamp; and initiating an action based on the time difference.

One or more aspects of the subject disclosure include, in whole or in part, obtaining, by a processing system including a processor, first data associated with a first communication service; obtaining, by the processing system, second data associated with the first communication service subsequent to the obtaining of the first data; determining, by the processing system, that a first time difference between the obtaining of the first data and the obtaining of the second data is less than a first threshold, resulting in a first determination; storing, by the processing system and based on the first determination, the second data; obtaining, by the processing system, third data associated with a second communication service; obtaining, by the processing system, fourth data associated with the second communication service subsequent to the obtaining of the third data; determining, by the processing system, that a second time difference between the obtaining of the third data and the obtaining of the fourth data is greater than a second threshold, resulting in a second determination; and denying, by the processing system and based on the second determination, a storage of the fourth data.

Figure 1:
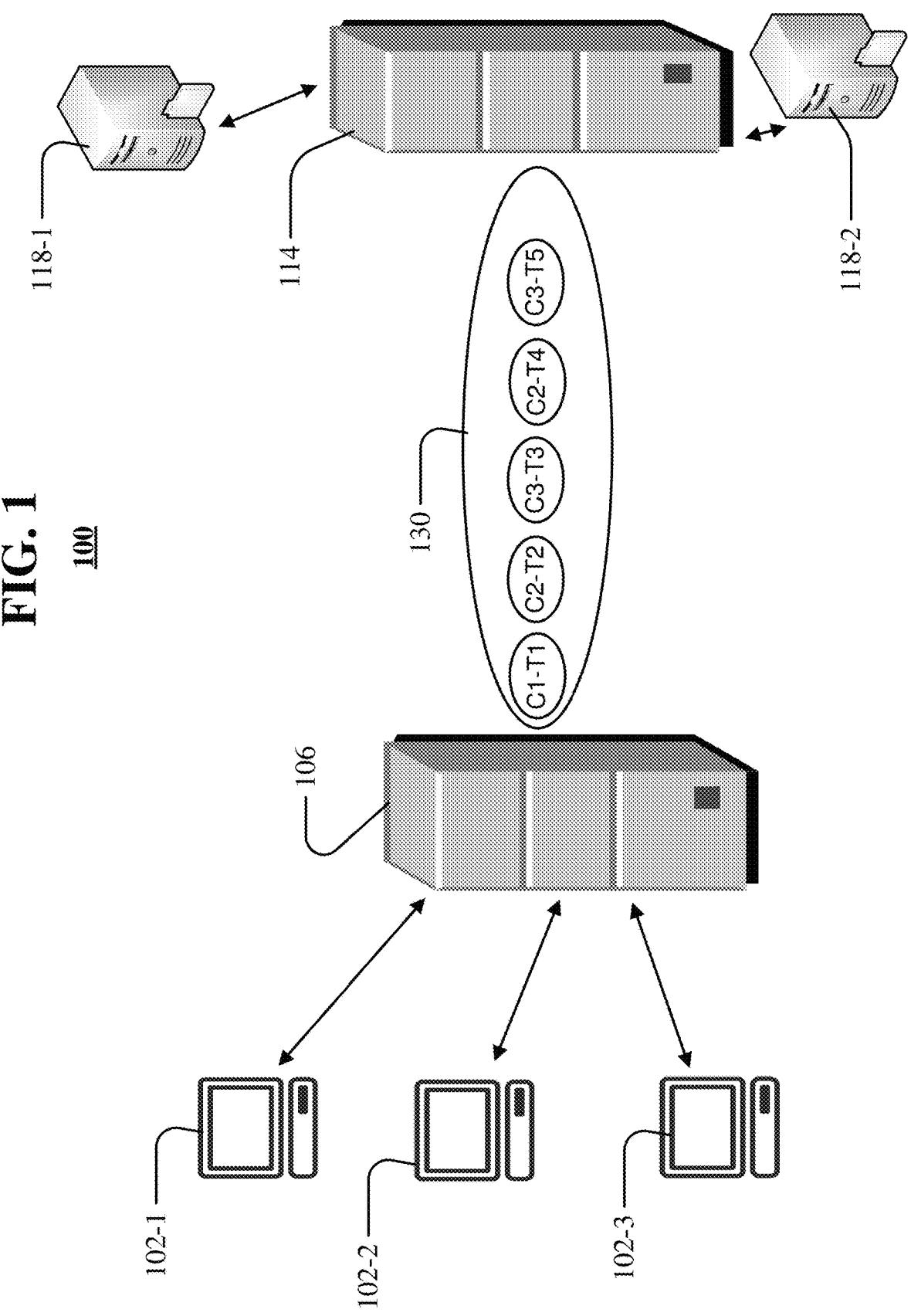
FIG. 1 is a block diagram illustrating an exemplary, non-limiting embodiment of a system or network incorporating a queue for data/data items in accordance with various aspects described herein.

Referring to FIG. 1, a block diagram illustrating an exemplary, non-limiting embodiment of a system 100 in accordance with various aspects described herein is shown. The system 100 may include a number of entities or devices, such as for example a first client 102-1, a second client 102-2, and a third client 102-3. While three clients are shown, any number of clients may be included in a given embodiment. The clients 102-1, 102-2, and 102-3 may be communicatively coupled to a server 106. The clients 102-1, 102-2, and 102-3 and/or the server 106 may be operative in conjunction with a gRPC framework.

In some embodiments, the server 106 may facilitate one or more communication services (e.g., a streaming service) that may be monitored or observed by the clients 102-1, 102-2, 102-3. The clients 102-1, 102-2, and 102-3 may collect or generate statistics pertaining to qualities or characteristics of the communication services. As part of the one or more communication services, the server 106 may obtain data (or, analogously, packets) from an aggregation node 114. As the nomenclature implies, the aggregation node 114 may obtain/aggregate the data or packets that are to be provisioned as part of the communication service(s) from one or more computational or storage nodes, illustratively represented by the nodes 118-1 and 118-2 in FIG. 1. The data/packets may be provided by the aggregation node 114 to the server 106 for dissemination or distribution.

As part of transferring or conveying the data from the aggregation node 114 to the server 106, a queue 130 may be utilized. The queue 130 may be organized as a first-in first-out (FIFO), and the flow of data within the queue may be in a right-to-left manner in the orientation shown in FIG. 1. The queue 130 is shown in FIG. 1 at a particular moment in time where there are five items of data, represented as C1-T1, C2-T2, C3-T3, C2-T4, and C3-T5. By convention, the format of the data may generally be represented as CX-TY, where X is representative of the client in question (e.g., C1 pertains to the first client 102-1, C2 pertains to the second client 102-2, and C3 pertains to the third client 102-3) and Y is representative of a timestamp (e.g., T1 is representative of a first moment in time, T2 is representative of a second moment in time that is subsequent to the first moment in time, T3 is representative of a third moment in time that is subsequent to the second moment in time, T4 is representative of a fourth moment in time that is subsequent to the third moment in time, and T5 is representative of a fifth moment in time that is subsequent to the fourth moment in time). The timestamp may be assigned at the time that the respective data item is obtained and is about to enter the queue 130.

It may be the case that based on a use of gRPC (or other framework) that each of the data items at the head/front of the queue 130 may need to be acknowledged as having been received by the respective client before the next data item can be transmitted. To demonstrate, based on the arrangement of the data items within the queue 130, it may be the case that the data item represented as C1-T1 may need to be transmitted with an acknowledgment of receipt by the first client 102-1 before the next data item C2-T2 in the queue 130 can be transmitted.

Assuming that the clients 102-1, 102-2, and 102-3, and any associated connections, links, or channels as between the clients and the server 106 are fully operational and functioning, the data items within the queue 130 may be processed (e.g., transmitted by the server 106 and acknowledged by the respective client), such that the provisioning of the communication service(s) may function as expected (e.g., with reasonably high quality). Further, once an acknowledgment is received from the client in respect of the data item at the front/head of the queue 130, that data item may effectively be removed/discarded from the queue 130 to allow the next data item in the queue 130 to be transmitted/conveyed.

However, in certain instances or scenarios it may be the case that a particular client (e.g., the first client 102-1), or any connection/link/channel associated with that client, becomes wholly or partially inoperable (or, analogously, may be functional but at a quality (e.g., a rate or speed) that is less than a threshold). What this means is that a data item that is distributed/disseminated may go unacknowledged for a considerable amount of time, and a bottleneck may form within the queue 130. To demonstrate, if the data item C1-T1 is not acknowledged by the first client 102-1 for a considerable amount of time (e.g., an amount of time exceeding a threshold), a backlog of data items may form within the queue 130. Furthermore, assuming that there is an issue with the first client 102-1 that is preventing the first client 102-1 from timely acknowledging receipt of the data item C1-T1, this means that other data items (e.g., C2-T2, C3-T3, C2-T4, C3-T5) involving other clients (e.g., the second client 102-2 and the third client 102-3) may be stalled within the queue 130, compromising the performance of the system 100 with respect to those other clients. Further, if the backlog within the queue 130 persists for long enough, an out of memory (OOM) condition may be encountered.

In an effort to mitigate the impact of one client on other clients, separate queues may be utilized for each client in some embodiments. For example, and with reference to the system 200 of FIG. 2, a first queue 230-1 may be utilized in conjunction with the first client 102-1 (with the data items C1-T1 and C1-T2 shown in the first queue 230-1), a second queue 230-2 may be utilized in conjunction with the second client 102-2 (with the data items C2-T1, C2-T2, and C2-T3 shown in the second queue 230-2), and a third queue 230-3 may be utilized in conjunction with the third client 102-3 (with the data items C3-T1, C3-T2, C3-T3, and C3-T4 shown in the third queue 230-3). By virtue of the arrangement shown in FIG. 2 (with each client being allocated its own respective queue) an issue experienced by one client will not immediately impact the other clients. However, it may be the case that the queues 230-1, 230-2, and 230-3 may utilize a common resource (potentially including a common memory), such that an issue experienced by one client may still, eventually, have an impact on one or more of the other clients (such as, for example, in relation to an OOM condition).

Figure 2:
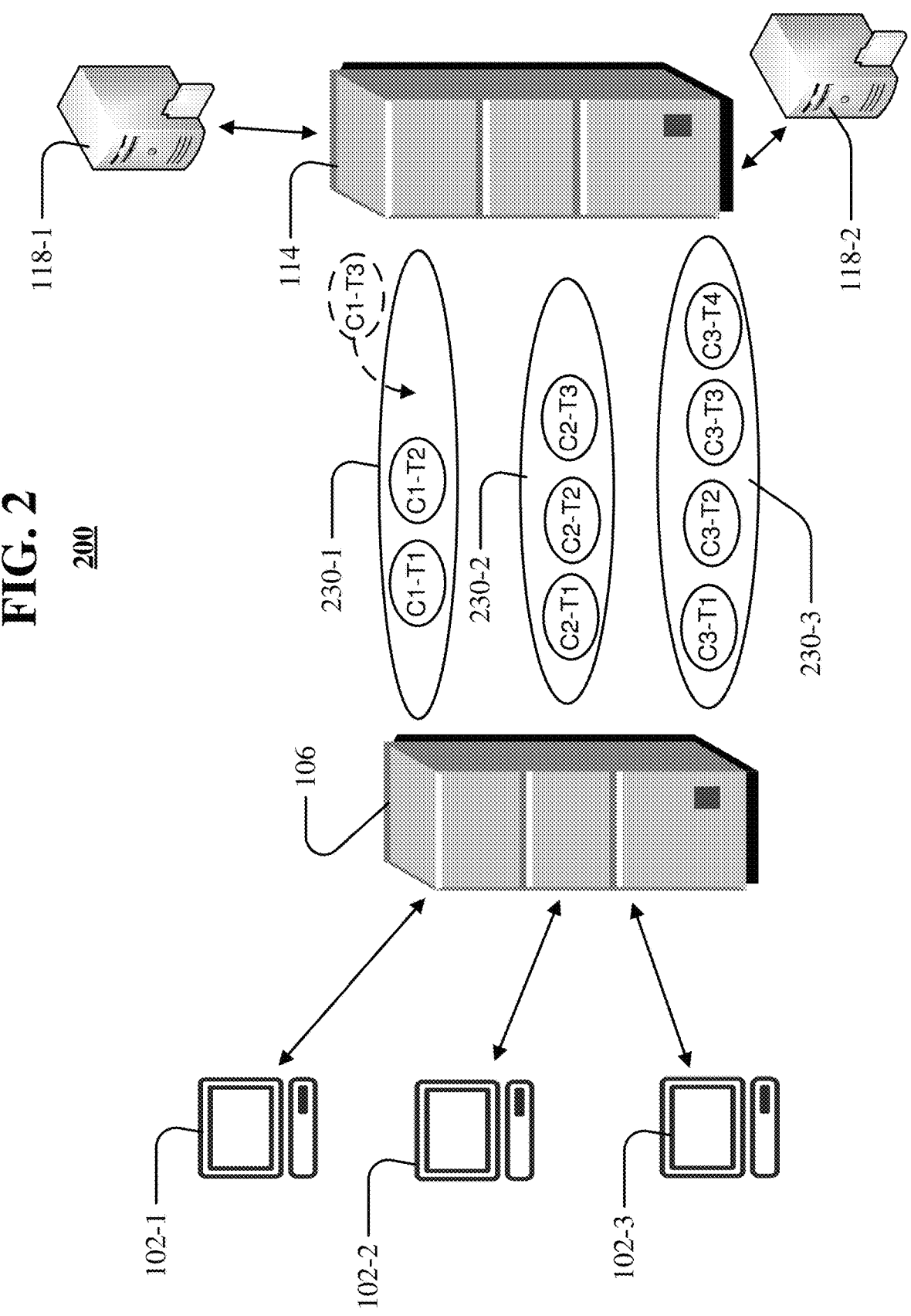
FIG. 2 is a block diagram illustrating an exemplary, non-limiting embodiment of a system or network incorporating multiples queues for data/data items in accordance with various aspects described herein.

To remedy the situation described above, entry of a given data item into a respective queue may be conditioned on satisfying a test pertaining to a staleness of the data items in the queue. To demonstrate, at a time T3 it may be the case that a data item C1-T3 may be ready to be provided/assigned to the first queue 230-1 by the aggregation node 114. However, rather than simply admitting the data item C1-T3 to first queue 230-1, an assessment may be undertaken to determine the amount of time between the oldest data item still remaining/already present in the first queue 230-1 that has not been acknowledged (which, in the case of the first queue 230-1 shown in FIG. 2 is the data item C1-T1) and the time (e.g., T3) at which the next data item (e.g., C1-T3) is potentially being added/admitted to the first queue 230-1. This difference in time (deltaT) for the scenario involving the first queue 230-1 shown in FIG. 2 may be expressed as:

$$deltaT = T3 - T1$$

The value of the time difference deltaT may be compared to a threshold. If the value of deltaT is greater than the threshold, this means that the first, unacknowledged data item (C1-T1) at the front/head of the first queue 230-1 may be declared/deemed as being 'stale'. As a result of that first, unacknowledged data item at the front/head of the first queue 230-1 being stale the data item C1-T3 may be denied entry/admission into the first queue 230-1. As a further guard against an OOM condition, one or more additional data items (aside from the data item C1-T1 at the front/head of the first queue 230-1) may potentially be purged from the first queue 230-1—e.g., the data item C1-T2 already present in the first queue 230-1 may be purged from the first queue 230-1 as a result of the data item C1-T1 being stale. Conversely, if the value of deltaT is not greater than the threshold (e.g., the value of deltaT is less than or equal to the threshold), this means that the first, unacknowledged data item (C1-T1) at the front/head of the first queue 230-1 may be declared/deemed as being 'fresh' or 'not stale', and as a result, the data item C1-T3 may be entered/admitted into the first queue 230-1.

The computation of deltaT set forth above was provided with specific reference to the conditions shown in FIG. 2 in respect of the first queue 230-1 at the time that the data item C1-T3 was being assessed for potential admission into the first queue 230-1. More generally, deltaT for any given queue may be expressed as:

deltaT=Timestamp of Most Recent Data Item−Timestamp Of Oldest Unacknowledged Data Item.

In some embodiments, a connection (e.g., a TCP connection) associated with a partially or wholly inoperable or compromised (gRPC) client may be closed or released, which may lend itself to a graceful closing of a session involving that client. The closing of the session may, in turn, be accompanied by a release of resources that may involve that client (for potential reuse or reallocation to other clients). In some embodiments, an alarm, a warning, a message, or the like may be provided to a client when it is detected that the value of deltaT described above exceeds the threshold (meaning that there is a stale, unacknowledged data item in the respective queue). For example, a command line interface (CLI) may be utilized to convey status or take/initiate appropriate action. In this manner, issues involving the client may be addressed promptly, potentially before the issues have negative or detrimental consequences on qualities or characteristics of a provisioning of a communication service or an execution of an application.

It is understood and appreciated that while a particular form or arrangement of entities/devices is shown in FIGS. 1-2, the particular form/arrangement is illustrative. As one of skill in the art will appreciate, various aspects of this disclosure, inclusive of aspects/features associated with FIGS. 1-2 described above, may be implemented using hardware, software, firmware, or any combination thereof. Further, aspects of the systems 100 and 200 may be combined in some embodiments. Functionality associated with a first device or entity may be reallocated to one or more other devices or entities without departing from the scope and spirit of this disclosure.

Figure 3:
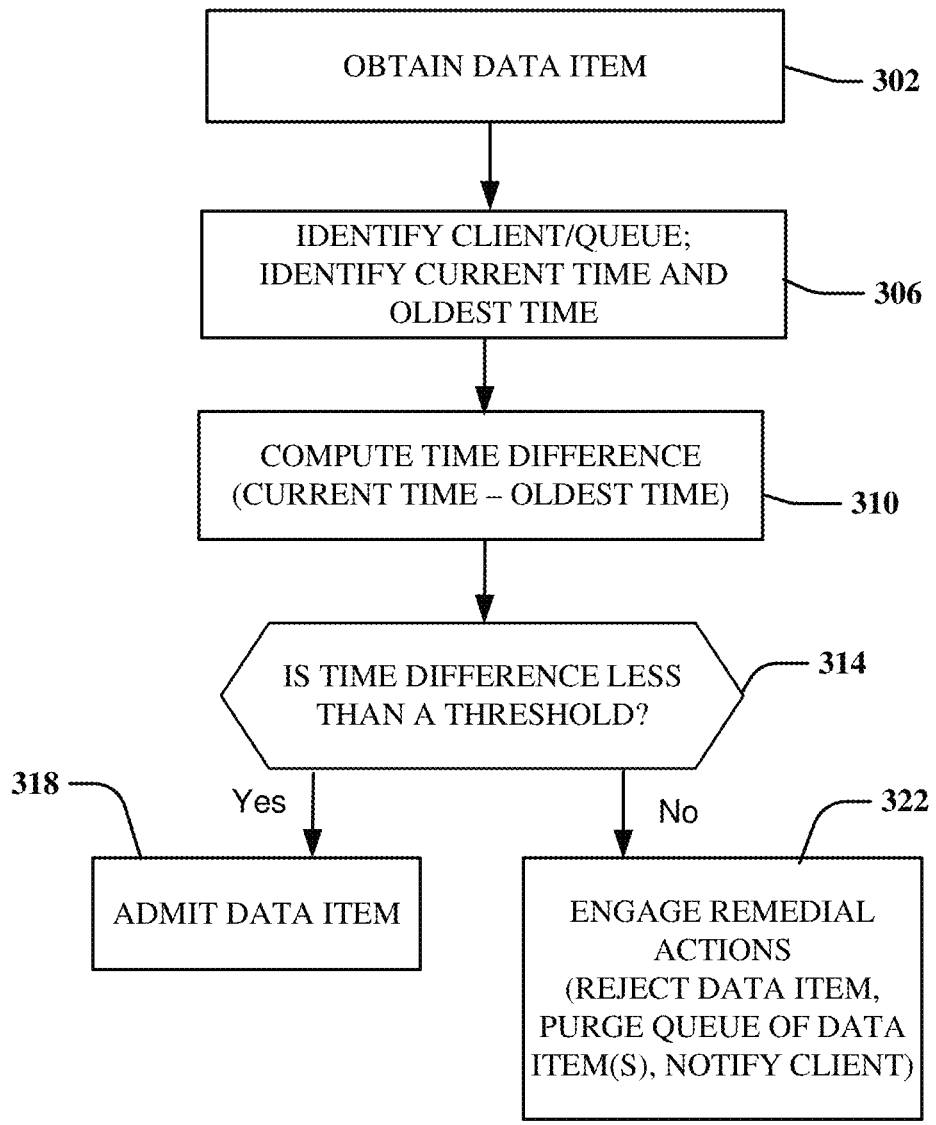
FIG. 3 depicts an illustrative embodiment of a method in accordance with various aspects described herein.

Referring now to FIG. 3, an illustrative embodiment of a method 300 in accordance with various aspects described herein is shown. The method 300 may be implemented (e.g., executed), in whole or in part, in conjunction with one or more systems, devices, and/or components, such as for example the systems, devices, and components set forth herein. The method 300 may be used to manage or regulate a use of resources, potentially as part of facilitating one or more communication services or applications. The method 300 may be used to assess a health status of one or more clients (or associated communication channels, links, or the like).

In block 302 a data item may be obtained. For example, the data item of block 302 may be obtained as part of a communication service or session. The data item may be obtained based on a request for the data item.

In block 306, a determination or identification may be made of a client (or, analogously, a queue associated with the client) associated with the data item obtained as part of block 302. As part of block 306, a current time (associated with the data item) and an oldest time (associated with a data item that has not been acknowledged by the client) may be determined/identified. One or more timestamps may be used to facilitate the determination/identification of such times. For example, a timestamp may be assigned or determined at a time that a given data item is obtained or received.

In block 310, a time difference (deltaT) may be computed as the difference between the current time and the oldest time identified as part of block 306.

In block 314, a determination may be made whether the time difference computed as part of block 310 is less than a threshold. If so, flow may proceed from block 314 to block 318; otherwise, flow may proceed from block 314 to block 322.

In block 318, the data item (of block 302) may be admitted. For example, as part of block 318 the data item may be entered/stored at the back or tail end of a (FIFO) queue.

In block 322, one or more remedial actions may be undertaken. For example, and due to 'staleness' of data in a queue, the data item (of block 302) may be rejected or denied entry into the queue, one or more other data items may be purged from the queue, a client may be notified of the condition of 'staleness', etc. Notification of the client may result in the client taking one or more actions that may cause the condition of 'staleness' to abate—e.g., the client may issue a notification or acknowledgment of receipt in respect of a data item that, to that point, went unacknowledged by the client.

Taken collectively and individually, one or more operations of blocks 318 and 322 may amount to a taking, or an initiation, of one or more actions.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. A given operation or feature may be based on one or more other operations or features. Aspects of the method 300 may be executed iteratively or repeatedly to account for various data items, services, applications, clients, etc. In this regard, terms like "first", "second", "third", "fourth", and so on, may be utilized to distinguish or differentiate between respective instances of aspects or features of the method 300.

As set forth above, aspects of this disclosure may be applied in respect of one or more frameworks or platforms, such as a gRPC framework. Aspects of this disclosure may be used to monitor and assess a health status of any data, signal, or message exchanges involving two or more entities or devices. Further, aspects of this disclosure may be used to proactively identify issues (such as the potential for an OOM condition) by selecting thresholds relative to an amount of data that is generated and a capacity of resources that are available. In this regard, the various aspects of this disclosure are integrated as part of numerous practical applications involving scarce resources and stringent reliability/quality requirements or goals. Further, as demonstrated herein, the various aspects of this disclosure represent substantial improvements to technology in terms of enhanced performance and reliability of communication services and applications. In brief, and as one skilled in the art will appreciate based on a review of this disclosure, the various aspects of this disclosure are not directed to abstract ideas. To the contrary, the various aspects of this disclosure are directed to, and encompass, significantly more than any abstract idea standing alone.

Figure 4:
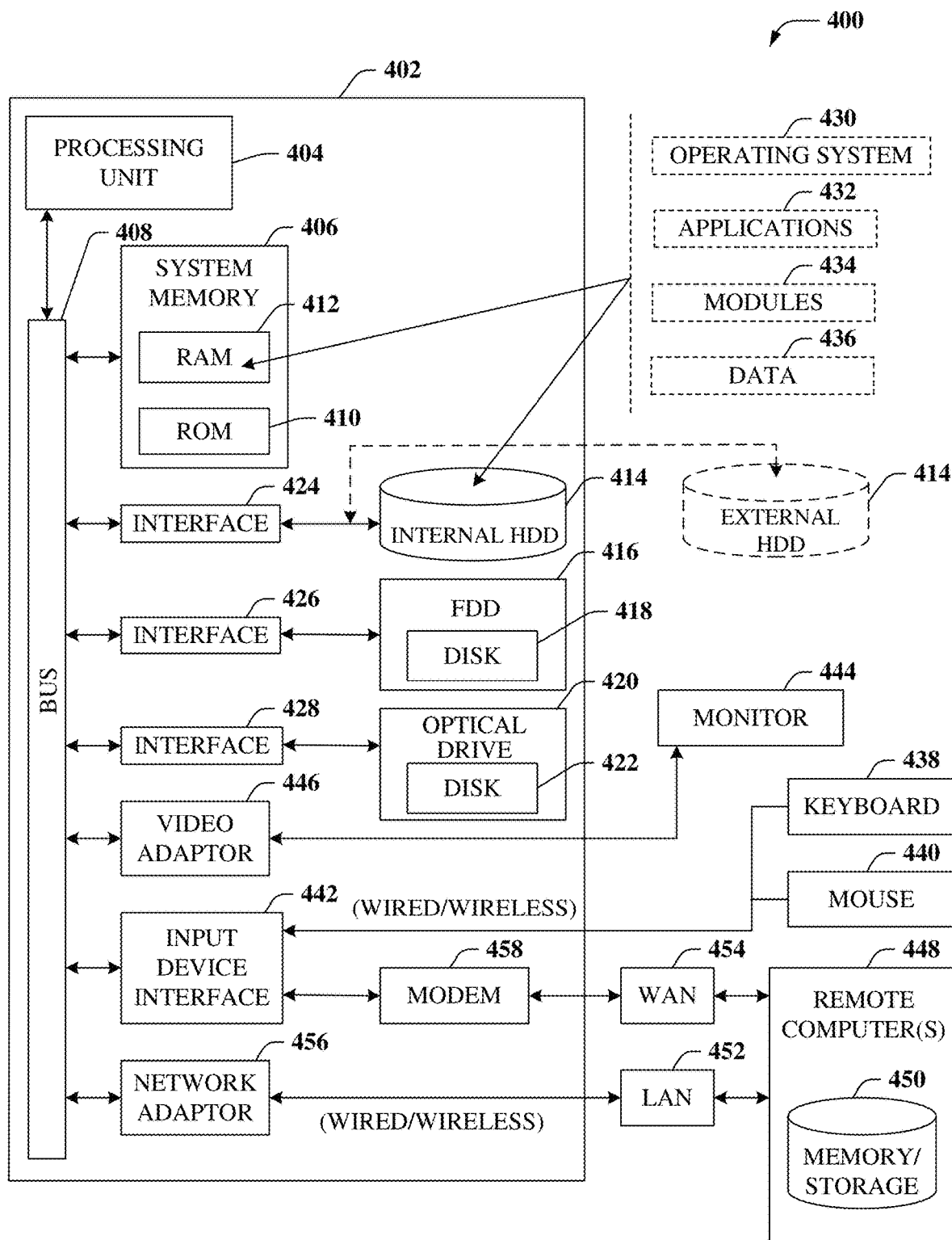
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, the computing environment 400 can facilitate, in whole or in part, identifying a first client that is associated with a first data item, identifying a first time when the first data item is obtained, identifying a second time associated with a second data item, wherein a receipt of the second data item has not been acknowledged by the first client when the first data item is obtained, computing a first time difference between the first time and the second time, comparing the first time difference to a first threshold, resulting in a first comparison, and initiating a first action based on the first comparison. The computing environment 400 can facilitate, in whole or in part, obtaining a first data item, based on the obtaining of the first data item, generating a first timestamp, storing the first data item in a queue, obtaining a second data item, based on the obtaining of the second data item, generating a second timestamp, based on the obtaining of the second data item, determining that the first data item is an oldest data item stored in the queue, based on the determining, computing a time difference between the second timestamp and the first timestamp, and initiating an action based on the time difference. The computing environment 400 can facilitate, in whole or in part, obtaining, by a processing system including a processor, first data associated with a first communication service, obtaining, by the processing system, second data associated with the first communication service subsequent to the obtaining of the first data, determining, by the processing system, that a first time difference between the obtaining of the first data and the obtaining of the second data is less than a first threshold, resulting in a first determination, storing, by the processing system and based on the first determination, the second data, obtaining, by the processing system, third data associated with a second communication service, obtaining, by the processing system, fourth data associated with the second communication service subsequent to the obtaining of the third data, determining, by the processing system, that a second time difference between the obtaining of the third data and the obtaining of the fourth data is greater than a second threshold, resulting in a second determination, and denying, by the processing system and based on the second determination, a storage of the fourth data.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a first client that is associated with a first data item;
identifying a first time when the first data item is obtained for potential storage in a first queue;
identifying a second time associated with a second data item in the first queue, wherein a receipt of the second data item has not been acknowledged by the first client when the first data item is obtained;
computing a first time difference between the first time and the second time;
comparing the first time difference to a first threshold, resulting in a first comparison; and
initiating a first action based on the first comparison.

2. The device of claim 1, wherein the first comparison indicates that the first time difference is less than the first threshold.

3. The device of claim 2, wherein the initiating of the first action comprises storing the first data item in the first queue.

4. The device of claim 3, wherein the first queue contains a third data item that is associated with a second client that is different from the first client.

5. The device of claim 3, wherein the operations further comprise:
identifying a second client that is associated with a third data item;
identifying a third time when the third data item is obtained;

identifying a fourth time associated with a fourth data item that has not been acknowledged by the second client;

computing a second time difference between the third time and the fourth time;

comparing the second time difference to a second threshold, resulting in a second comparison; and initiating a second action based on the second comparison.

6. The device of claim 5, wherein the second comparison indicates that the second time difference is less than the second threshold.

7. The device of claim 6, wherein the initiating of the second action comprises storing the third data item in a second queue that is different from the first queue.

8. The device of claim 7, wherein the first queue includes a first plurality of data items associated with the first client and the second queue includes a second plurality of data items associated with the second client, and wherein the first queue and the second queue utilize a common resource that includes a common memory.

9. The device of claim 1, wherein the first data item is associated with a streaming communication service, and wherein the processing system and the first client are operative in accordance with a gRPC framework.

10. The device of claim 1, wherein the second time is based on when the second data item is obtained.

11. The device of claim 1, wherein the first comparison indicates that the first time difference is greater than the first threshold.

12. The device of claim 11, wherein the initiating of the first action comprises denying a storage of the first data item in the first queue.

13. The device of claim 11, wherein a third data item is in the first queue when the first data item is obtained, and wherein the initiating of the first action comprises purging the third data item from the first queue.

14. The device of claim 11, wherein the initiating of the first action comprises sending a notification to the first client.

15. The device of claim 11, wherein the initiating of the first action utilizes a command line interface (CLI).

16. A non-transitory machine-readable medium, comprising executable instructions that, when executed by a processing system including a processor, facilitate performance of operations, the operations comprising:

identifying a first client that is associated with a first data item;

identifying a first time when the first data item is obtained for potential storage in a first queue;

identifying a second time associated with a second data item in the first queue, wherein a receipt of the second data item has not been acknowledged by the first client when the first data item is obtained;

computing a first time difference between the first time and the second time; and initiating a first action based on the computing.

17. The non-transitory machine-readable medium of claim 16, wherein the first time difference is less than a threshold.

18. The non-transitory machine-readable medium of claim 17, wherein based on the first time difference being less than the threshold the initiating of the first action comprises storing the first data item in the first queue.

19. A method, comprising:

identifying, by a processing system including a processor, a first client that is associated with a first data item;

identifying, by the processing system, a first time when the first data item is obtained for potential storage in a first queue;

identifying, by the processing system, a second time associated with a second data item in the first queue, wherein a receipt of the second data item has not been acknowledged by the first client when the first data item is obtained;

computing, by the processing system, a first time difference between the first time and the second time;

comparing, by the processing system, the first time difference to a first threshold, resulting in a first comparison;

determining, by the processing system and based on the first comparison, that the first time difference is greater than the first threshold; and initiating a first action based on the determining.

20. The method of claim 19, wherein the initiating of the first action comprises denying a storage of the first data item in the first queue.

* * * * *